United States Patent [19]

Chretien et al.

[11] 3,860,555

[45] Jan. 14, 1975

[54] POLYMERIZABLE COMPOSITIONS AND ARTICLES PRODUCED THEREFROM AND METHOD

[75] Inventors: Gilbert Chretien, Chauny; Philippe Girard, Autreville; Jean-Marc Lamy, Villequier-Aumont; Christophe Menard, Sinceny, all of France

[73] Assignee: Rhone-Progil, Paris, France

[22] Filed: Oct. 5, 1972

[21] Appl. No.: 295,266

[30] Foreign Application Priority Data
Oct. 6, 1971  France .............................. 71.35950

[52] U.S. Cl................ 260/40 R, 260/453, 260/861
[51] Int. Cl............................................. C08g 17/16
[58] Field of Search............ 260/861, 863, 453 R, 260/502 A, 502 R

[56] References Cited
UNITED STATES PATENTS

| | | | |
|---|---|---|---|
| 2,661,363 | 12/1953 | Dickey ............................ | 260/453 R |
| 3,079,363 | 2/1963 | Koch et al. ..................... | 260/863 X |
| 3,408,423 | 10/1968 | Friedman et al................ | 260/861 X |
| 3,644,612 | 2/1972 | Meyer et al..................... | 260/863 X |

*Primary Examiner*—Morris Liebman
*Assistant Examiner*—S. M. Person

[57] ABSTRACT

A polymerizable composition of polyester resin plus monomer having an ethylenic double bond and a catalyst in the form of a tertiary butyl perester of a chlorinated aliphatic monoacid having from 3 to 12 carbon atoms, and shaped articles and method for producing same.

14 Claims, No Drawings

POLYMERIZABLE COMPOSITIONS AND ARTICLES PRODUCED THEREFROM AND METHOD

The present invention relates to new compositions of polyester resins and monomers which are copolymerizable at medium and high temperatures and it relates particularly to a catalytic system for these compositions.

Unsaturated polyesters are generally copolymerized with vinylic monomers in the presence of catalysts such as benzoyl peroxide or ketone peroxides. These catalysts cannot be introduced into the composition a long time before polymerization and/or require the addition, before this operation, of a compound which modifies the action of the catalyst.

Applicants have obtained and it is an object of this invention to provide new compositions containing a class of catalysts which have not hitherto been used for fixing vinylic or allylic monomers onto an unsaturated alkyd chain, and which ease the conditions for application of these resins. They can also be incorporated in the composition long before use of the resin, which consequently can be stored without change at close to ambient temperature, even in the presence of conventional accelerators such as cobalt naphthenate.

In accordance with one aspect of the invention, there is provided a polymerizable composition, which comprises an unsaturated polyester, at least one monomer having an ethylenic double bond, and a catalyst comprising a tertiary butyl perester of a chlorinated aliphatic monoacid, having from 3 to 12 carbon atoms.

Examples of such peresters are tertiobutyl perchloropropionate, tertiobutyl perdichloropropionate, tertiobutyl perchlorodecanoate and tertiobutyl pertrichloroacrylate.

The peresters are generally dissolved during their preparation in an organic solvent, preferably a phthalate, and especially dimethyl phthalate. The content of catalyst, expressed as the weight of active oxygen in the solution, is preferably from 2% to 6%. The amount of catalyst present in the composition, expressed as active oxygen, is preferably from 0.05% to 0.2% by weight of the constituents.

In addition to the polyester, usually obtained by condensation of at least one polycarboxylic acid and at least one polyol or an internal ether oxide, and containing ethylenic double bonds and at least one vinylic or allylic monomer and a catalyst, the composition may contain accelerators and different ingredients, such as a colorant or a filler generally used in such resins. The compounds, of which part must be unsaturated, giving unsaturated polyester chains by polycondensation, as well as the vinylic or allylic monomers ensuring reticulation of these chains, can be chosen, for example, among those mentioned in pages 13 to 40 of "Polyester Resins" (Lawrence), published in 1960 by Reinhold Publishing Corporation, New York. The other possible ingredients of the resins, apart from the catalysts, are also mentioned in this work. The accelerators, preferably used, are organic salts of vanadium and cobalt, particularly naphthenates. The content by weight of these compounds, when present, is from 0.05% to 0.2% of the total composition. Alkoylaromatic amines are also active accelerators for the majority of these catalysts at medium temperature (50°–80°C).

The compositions obtained, particularly containing cobalt naphthenate, can be stored for more than 24 hours at 25°C, whereas with a ketone peroxide, the period of storage cannot exceed 2 hours.

Such compositions can be used notably for stratified articles at medium temperature (50°–80°C) or for articles formed by pressing (80°–120°C). At medium temperatures an accelerator is incorporated in the composition; the catalyst should not be accelerated at high temperatures.

In order to further explain the action of these catalysts, two tables are given below quantitively showing the results of this action.

The catalyst is introduced in a resin comprising polypropylene glycol maleophthalate and 37% of styrene on the total weight of the resin; the viscosity, at 25°C, is 4 poises. The catalysts are used in an amount to give 0.076% of active oxygen in the total weight of resin. Table I gives the gelling time at 50°C.

TABLE I

| Catalyst | Gelling time without accelerator | Gelling time with 0.2% by weight of vanadium salts |
|---|---|---|
| t-butyl peroxy-dichloropropionate | 1 hour | 28 minutes |
| t-butyl peroxy-propionate | do | 15 minutes |
| t-butyl peroxy-chlorodecanoate | do | 48 minutes |
| t-butyl peroxy-dichloropropionate | do | 1 hour |

Table II gives the gelling time at 70°C.

TABLE II

| Catalyst | Gelling time without accelerator |
|---|---|
| Tertiobutyl permonochloropropionate | 25 minutes |
| Tertiobutyl perchloropropionate | 21 minutes |
| Tertiobutyl perchlorodecanoate | 14 minutes |
| Tertiobutyl pertrichloroacrylate | 25 minutes |

The following examples are given by way of illustration, but not by way of limitation:

EXAMPLE 1

This example describes the use of the composition of the invention in the manufacture of sheets of polyester reinforced with glass fibers.

This manufacturing process consists of impregnating a mat of glass fibers with a catalyzed resin and polymerizing this resin in a tunnel oven in a continuous process.

In order to carry out the impregnation, a transparent cellulose film, known under the commercial name of "Cellophane", 40 cm/wide, is transported by means of a train of rollers in conventional manner on a flat, horizontal table at a speed of 40 cm/minute. 110 grams per minute of resin, spread by means of a horizontal knife, is fed to the film and a glass fiber mat of the same width, weighing 450 g/m$^2$, is applied to the film. A second cellulose film identical to the first is then stretched over the mat. The gap of 1 mm, between the roller applying the second film and the table, determines the thickness of the sheet. A distance of 60 cm is provided between the zone of the table at which the mat is applied and the entrance to the oven. The temperature in this zone is held at 30°C which allows a uniform impregnation of the mat. The heated tunnel is arranged along an extension of the table and comprises four ovens of 60 cm length arranged side by side.

The resin used is a mixture having a viscosity of 4 poises at 25°C of poly-propylene glycol maleophthalate and 37% of the weight of the resin of styrene, to which a chlorinated tertiobutyl perester in solution in methyl phthalate is added in an amount to provide a content of active oxygen of 0.15%, and optionally an accelerator of from 0.05% to 0.3% of cobalt or vanadium naphthenate. This resin also contains 0.2 parts per million of copper and 70 parts per million by weight of hydroquinone.

The operating conditions and the results are given in the following Table III.

TABLE III

| Peroxides | Parts per million by weight of cobalt and/or vanadium in the composition | Oven temperature in vacuum in °C | | Distance from the gellification zone at the oven entrance in cm | Distance from the exothermic peak to the oven entrance in cm | Temperature of peak in °C | Hardness Barcol |
|---|---|---|---|---|---|---|---|
| | | Two first ovens | Others | | | | |
| t-butyl peroxydecanoate | 50 (Co) | 80 | 80 | 75 | 130 | 144 | 55 |
| | 30 (Co) | 90 | 100 | 80 | 143 | 160 | 45 |
| | 0 | 90 | 100 | 150 | 212 | 151 | 48 |
| t-butyl Peroxychloropropionate | 50 (V) | 80 | 80 | 60 | 200 | 92 | 50 |
| | 0 | 100 | 100 | 126 | 240 | 126 | 30 |
| t-butyl peroxytrichloroacrylate | 30 (Co) | 100 | 100 | 90 | 180 | 169 | 50 |

The Barcol hardness is measured according to the method prescribed by the AFNOR (NF-P 38-501) standard 15 minutes after leaving the oven. The sheets are smooth and are free from structural faults.

EXAMPLE 2

This example describes the use of the composition of the invention in the manufacture of serving trays reinforced by glass fibers.

In half of a mold of chrome steel for making sheet 43 cm long and 30 cm wide, having an inclined border of 1 cm and a thickness of 0.3 cm, there are placed two superposed glass mats having a weight of 450 g/m² cut to the dimensions of the mold. There is then added 186 g of a composition of a resin containing 72% by weight of poly-propylene glycol maleophthalate and 28% of styrene (the mixture has a viscosity of 30 poises at 25°C) to which has been added a quantity of tertiobutyl perchlorodecanoate such that the content by weight of active oxygen in the composition is 0.15%.

A die of corresponding shape is applied by means of a press at a pressure of 43 kg/cm². The mold is held at 100°C for 4½ minutes.

The trays obtained have, after 15 minutes cooling, a Barcol hardness of 40.

It will be understood that changes may be made in the details of formulation and operation without departing from the spirit of the invention, especially as defined in the following claims.

We claim:
1. A polymerizable composition, which comprises an unsaturated polyester, at least one monomer having an ethylenic double bond, and a catalyst comprising a tertiary butyl perester of a chlorinated aliphatic monoacid, the acid having from 3 to 12 carbon atoms, the catalyst being present in an amount within the range of 0.05 to 0.2% based on the weight of the active oxygen to the total weight of the polyester and monomer.
2. A composition as claimed in claim 1 in which the catalyst is selected from the group consisting of t-butyl peroxychloropropionate, t-butyl peroxydichloropropionate, t-butyl peroxychlorodecanoate and t-butyl peroxytrichloroacrylate.
3. A composition as claimed in claim 1 in which the polyester is poly-propylene glycol maleophthalate.
4. A composition as claimed in claim 1 in which the monomer is styrene.
5. A composition as claimed in claim 1 in which the catalyst is added to the composition as a solution in a liquid phthalate.
6. A composition as claimed in claim 1 in which the composition contains at least one accelerator.
7. A composition as claimed in claim 6 in which the accelerator is an organic salt of vanadium or cobalt.
8. A composition as claimed in claim 7 in which the accelerator is present in an amount within the range of 0.05% to 0.2% by weight of the composition.
9. A composition as claimed in claim 6 in which the accelerator is an alkoylaromatic amine.
10. A method of making shaped articles which comprises forming a composition as claimed in claim 1 to the desired shape and heating the composition at a temperature within the range of 80°–120°C.
11. A method of making shaped articles which comprises forming a composition claimed in claim 6 to desired shape and heating the composition at a temperature within the range of 50°–80°C.
12. A method as claimed in claim 10 which includes the step of impregnating a mass of glass fibers with the composition during shaping.
13. Shaped articles produced by the method claimed in claim 10.
14. Shaped articles produced by the method claimed in claim 12.

* * * * *

UNITED STATES PATENT OFFICE
CERTIFICATE OF CORRECTION

Patent No. 3,860,555                    Dated   January 14, 1975

Inventor(s)  Gilbert Chretien et al.

It is certified that error appears in the above-identified patent and that said Letters Patent are hereby corrected as shown below:

column 2, Table I, under "Catalyst"

cancel "t-butyl peroxy dichloropropionate"
        and substitute --- t-butyl peroxy chloropropionate--;

cancel "t-butyl peroxy propionate" and substitute
        --- t-butyl dichloropropionate ---;

cancel "t-butyl peroxydichloropropionate" and
        substitute --- t-butyl peroxychloroacrylate ---.

column 2, Table I, under "Gelling time without accelerator"
    in line 28, before "1 hour" insert > column 2, Table II, under "catalyst"

cancel "tertiobutyl permonochloropropionate" and
        substitute --- t-butyl peroxychloropropionate ---;

canbel "tertiobutyl perchloropropionate" and
        substitute --- t-butyl dichloropropionate ---;

cancel "tertiobutyl perchlorodecanoate" and
        substitute --- t-butyl peroxychlorodecanoate ---;

cancel "tertiobutyl pertrichloroacrylate" and
        substitute --- t-butyl peroxychloroacrylate ---.

Signed and Sealed this third Day of February 1976

[SEAL]

Attest:

RUTH C. MASON  
*Attesting Officer*

C. MARSHALL DANN  
*Commissioner of Patents and Trademarks*